United States Patent
Kim et al.

(10) Patent No.: US 11,572,949 B1
(45) Date of Patent: Feb. 7, 2023

(54) SKIN CONSTRAINED INFLATABLE BELLOWS

(71) Applicants: GM Global Technology Operations LLC, Detroit, MI (US); REGENTS OF THE UNIVERSITY OF MICHIGAN, Ann Arbor, MI (US)

(72) Inventors: Wonhee Michael Kim, Royal Oak, MI (US); Paul W. Alexander, Ypsilanti, MI (US); Diann Brei, Milford, MI (US); Jonathan E. Luntz, Ann Arbor, MI (US); Laura Alejandra Giner Munoz, Ann Arbor, MI (US); Koray Benli, Ann Arbor, MI (US); Adeline Emily Wihardja, Ann Arbor, MI (US); Evan Millison, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/835,202

(22) Filed: Jun. 8, 2022

(51) Int. Cl.
*F16J 3/04* (2006.01)

(52) U.S. Cl.
CPC *F16J 3/041* (2013.01); *F16J 3/04* (2013.01)

(58) Field of Classification Search
CPC ...... F16J 3/04; F16J 3/041; B25J 9/142; B25J 18/06
See application file for complete search history.

(56) References Cited

U.S. PATENT DOCUMENTS

| | | | | |
|---|---|---|---|---|
| 3,588,036 A | * | 6/1971 | Harter et al. | F16K 31/126 251/61 |
| 4,784,042 A | * | 11/1988 | Paynter | F15B 15/103 92/92 |
| 5,317,952 A | * | 6/1994 | Immega | F15B 15/10 901/22 |
| 10,562,180 B2 | * | 2/2020 | Telleria | F16J 3/04 |
| 11,084,541 B2 | * | 8/2021 | Kim | B62D 35/007 |
| 2021/0071659 A1 | | 3/2021 | Kim et al. | |
| 2021/0170951 A1 | | 6/2021 | Alexander et al. | |

* cited by examiner

Primary Examiner — Abiy Teka
(74) Attorney, Agent, or Firm — Vivacqua Crane PLLC (57) ABSTRACT

An incrementally assembled skin-constrained inflatable bellows system includes a top end cap, a bottom end cap, and a bellows attached to and separating the top end cap and the bottom end cap and configured to hold pressurized fluid between the top and bottom end caps. The system further includes a nozzle configured to allow fluid to enter and exit the bellows, and an inextensible skin attached to each of the top end cap, the bottom end cap, and to the bellows. The top end cap assumes a first position when the bellows is inflated via the nozzle and, when the top end cap is adjusted from the first position to a second position, the skin is configured to maintain the top end cap in the second position and constrains the bellows into a predefined rigid three-dimensional shape.

20 Claims, 5 Drawing Sheets

SKIN CONSTRAINED INFLATABLE BELLOWS

INTRODUCTION

The present disclosure relates to inflatable structures, and more specifically to inflatable bellows type structures in which rigidity of an inflated form of the structure is desired. Inflatable structures typically include a bladder that holds pressurized air or liquid, and threads that are attached to opposite internal surfaces of the bladder. The threads are typically attached to internal surfaces of the bladder. As the bladder is inflated, pressure within the bladder causes the bladder to expand outward and thereby applies tension to the threads which in turn limits expansion of the bladder. In addition to limiting expansion of the bladder, the threads increase the amount of compressive load that the bladder may withstand before the bladder deforms under compressive load. Such internally-tensioned inflatable structures are used in devices such as airplane wings that require high compressive strength to weight ratios.

While internally-tensioned inflatable structures achieve their intended purpose, there is a need for a new and improved inflatable structure and method of construction thereof, which maintains or increases the structural capabilities of the inflatable structures while improving packaging size, providing a rigid deployment in multiple degrees of freedom, having a smooth external surface which aids in cleaning, increasing shear resistance, and decreasing weight while maintaining or decreasing cost and decreasing manufacturing complexity.

SUMMARY

According to several aspects of the present disclosure an incrementally assembled skin-constrained inflatable bellows system includes a top end cap, a bottom end cap, and a bellows attached to and separating the top end cap and the bottom end cap and configured to hold pressurized fluid between the top and bottom end caps. The system further includes a nozzle configured to allow fluid to enter and exit the bellows, and an inextensible skin attached to each of the top end cap, the bottom end cap, and to the bellows. The top end cap assumes a first position when the bellows is inflated via the nozzle and, when the top end cap is adjusted from the first position to a second position, the skin is configured to maintain the top end cap in the second position and constrains the bellows into a predefined rigid three-dimensional shape.

In another aspect of the present disclosure the bellows includes one or more inflatable chambers. Each of the one or more inflatable chambers is formed of one or more top portions and one or more bottom portions. Each of the one or more top portions is sealed around a perimeter edge to one of the one or more bottom portions, and the perimeter edge defines a radially-extending bellows flange.

In yet another aspect of the present disclosure the one or more top portions and the one or more bottom portions define a folded portion of the bellows that extends in an axial direction between a perimeter edge of the top end cap and a perimeter edge of the bottom cap. The folded portion of the bellows includes one or more folds that reduce a stiffness of the bellows in an axial direction of the skin-constrained inflatable bellows system.

In still another aspect of the present disclosure the inextensible skin is replaceable. Differently shaped replaceable inextensible skins constrain the bellows to define different inflated three-dimensional geometries of the fully inflated skin-constrained inflatable bellows system.

In yet another aspect of the present disclosure the inextensible skin includes a plurality of bellows attachment features at predefined locations that align with one or more of the bellows flanges and the top and bottom end caps.

In still another aspect of the present disclosure the one or more of the radially-extending bellows flanges is attached to the inextensible skin at one or more of the plurality of bellows attachment features.

In yet another aspect of the present disclosure each of the one or more top portions includes one or more slots and each of the one or more bottom portions includes one or more slots, and the one or more top portions and the one or more bottom portions are heat sealed to one another only about the perimeter edge through use of a removable mask. The one or more slots in the one or more top and bottom portions allow airflow through the one or more top and bottom portions while maintaining a shape and structural integrity of the bellows.

In still another aspect of the present disclosure the bellows is formed of a material comprising one or more of: silicone, thermoplastic polyurethane (TPU), or a TPU-coated fabric. The bellows attachment features on the inextensible skin include TPU-impregnated portions of inextensible skin material. The removable mask is formed from a material including one or more of: paper, glassine, glycerine, and paper soap. The removable mask is soluble in a solvent that is not reactive with TPU, wherein the solvent comprises one or more of: water, acetone, and alcohol.

In yet another aspect of the present disclosure the inextensible skin fully encapsulates the bellows and provides a smooth external surface when the skin-constrained inflatable bellows system is fully inflated.

In a further aspect of the present disclosure the inextensible skin extends for a first axial distance on a first side of the bellows and for a second axial distance smaller than the first axial distance on a second side of the bellows. The second side is opposite the first side, and when the skin-constrained inflatable bellows system is fully inflated, the rigid three-dimensional shape is constrained by the skin to a non-rectilinear shape.

In another aspect of the present disclosure a method of producing a skin-constrained inflatable bellows includes incrementally assembling a top end cap, a bottom end cap, and a bellows attached to and separating the top end cap and the bottom end cap. The bellows is configured to hold pressurized fluid between the top and bottom end caps. The method further includes attaching an inextensible skin to each of the top end cap, the bellows, and the bottom end cap, and utilizing a nozzle disposed on one or more of the top end cap and the bottom end cap to allow fluid to enter and exit the bellows. The top end cap assumes a first position when the bellows is inflated via the nozzle and, when the top end cap is adjusted from the first position to a second position, the skin is configured to maintain the top end cap in the second position and constrains the bellows into a predefined rigid three-dimensional shape.

In yet another aspect of the present disclosure the method further includes assembling one or more inflatable chambers, wherein each of the one or more inflatable chambers is formed of one or more top portions and one or more bottom portions. The method includes sealing each of the one or more top portions around a perimeter edge to one of the one or more bottom portions. The perimeter edge defines a radially-extending bellows flange.

In still another aspect of the present disclosure the method further includes masking the one or more top portions and the one or more bottom portions with a removable mask, and heat sealing each of the one or more top portions to one of the one or more bottom portions only about the perimeter edge as a result of the masking. Each of the one or more top portions includes one or more slots and each of the one or more bottom portions includes one or more slots, and the one or more slots in the one or more top and bottom portions allows airflow while maintaining a shape and structural integrity of the bellows.

In yet another aspect of the present disclosure the method includes folding the one or more top portions and the one or more bottom portions to define a folded portion of the bellows that extends in an axial direction between a perimeter edge of the top end cap and a perimeter edge of the bottom cap. The folded portion of the bellows includes one or more folds that reduce a stiffness of the bellows in an axial direction of the skin-constrained inflatable bellows system.

In still another aspect of the present disclosure the method includes equipping the inextensible skin with a plurality of bellows attachment features at predefined locations that align with one or more of the bellows flanges and the top and bottom end caps.

IN yet another aspect of the present disclosure the method includes attaching the inextensible skin to the one or more of the radially-extending bellows flanges at one or more of the plurality of bellows attachment features.

In still another aspect of the present disclosure the method includes forming the bellows of a material comprising one or more of: silicone, thermoplastic polyurethane (TPU), or a TPU-coated fabric, forming the bellows attachment features on the inextensible skin from TPU-impregnated portions of inextensible skin material, and forming the removable mask from a material including one or more of: paper, glassine, glycerine, and paper soap, wherein the removable mask is soluble in a solvent that is not reactive with TPU. The solvent includes one or more of: water, acetone, and alcohol.

In yet another aspect of the present disclosure the method includes fully encapsulating the bellows with the inextensible skin to provide a smooth external surface when the skin-constrained inflatable bellows system is fully inflated. The inextensible skin is replaceable, and differently shaped replaceable inextensible skins constrain the bellows to define different inflated three-dimensional geometries of the fully inflated skin-constrained inflatable bellows system.

In still another aspect of the present disclosure the method includes producing a non-rectilinear rigid three-dimensional shape skin-constrained inflatable bellows by providing inextensible skin that extends for a first axial distance on a first side of the bellows and for a second axial distance smaller than the first axial distance on a second side of the bellows. The second side is opposite the first side.

In yet another aspect of the present disclosure an incrementally assembled skin-constrained inflatable bellows system includes a top end cap, a bottom end cap, and a bellows attached to and separating the top end cap and the bottom end cap and configured to hold pressurized fluid between the top and bottom end caps. The bellows includes one or more inflatable chambers. Each of the one or more inflatable chambers is formed of one or more top portions and one or more bottom portions. Each of the one or more top portions is sealed around a perimeter edge to one of the one or more bottom portions. The perimeter edge defines a radially-extending bellows flange. Each of the one or more top portions includes one or more slots and each of the one or more bottom portions includes one or more slots, and the one or more top portions and the one or more bottom portions are heat sealed to one another only about the perimeter edge through use of a removable mask. The removable mask is formed from a material comprising one or more of: paper, glassine, glycerine, and paper soap. The removable mask is soluble in a solvent that is not reactive with TPU. The solvent comprises one or more of: water, acetone, and alcohol. The one or more slots in the one or more top and bottom portions allow airflow through the one or more top and bottom portions while maintaining a shape and structural integrity of the bellows. The one or more top portions and the one or more bottom portions define a folded portion of the bellows that extends in an axial direction between a perimeter edge of the top end cap and a perimeter edge of the bottom cap. The folded portion of the bellows includes one or more folds that reduce a stiffness of the bellows in an axial direction of the skin-constrained inflatable bellows system. A nozzle is configured to allow fluid to enter and exit the bellows. An inextensible skin is attached to each of the top end cap, the bottom end cap, and to the bellows. The inextensible skin includes a plurality of bellows attachment features at predefined locations that align with one or more of the bellows flanges and the top and bottom end caps. The one or more of the radially-extending bellows flanges is attached to the inextensible skin at one or more of the plurality of bellows attachment features. The bellows is formed of a material comprising one or more of: silicone, thermoplastic polyurethane (TPU), or a TPU-coated fabric. The bellows attachment features on the inextensible skin include TPU-impregnated portions of inextensible skin material. The top end cap assumes a first position when the bellows is inflated via the nozzle and when the top end cap is adjusted from the first position to a second position, the skin is configured to maintain the top end cap in the second position and constrains the bellows into a predefined rigid three-dimensional shape. The inextensible skin fully encapsulates the bellows and provides a smooth external surface when the skin-constrained inflatable bellows system is fully inflated. When the inextensible skin extends for a first axial distance on a first side of the bellows and for a second axial distance smaller than the first axial distance on a second side of the bellows, the rigid three-dimensional shape is constrained by the skin to a non-rectilinear shape. The inextensible skin is replaceable, and differently shaped replaceable inextensible skins constrain the bellows to different inflated three-dimensional geometries of the fully inflated skin-constrained inflatable bellows system.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Certain devices, such as airplane wings, are designed to change shape during operation. Such devices typically include complex rigid mechanisms that enable the devices to change during operation of the devices. These rigid mechanisms increase the cost, mass, and storage size of the device.

A skin-constrained inflatable bellows system 10 according to the present disclosure may be incorporated into a device to enable the shape of the device to be changed during operation of the device without significantly increasing the cost, mass, and storage size of the device.

Figure 1A:
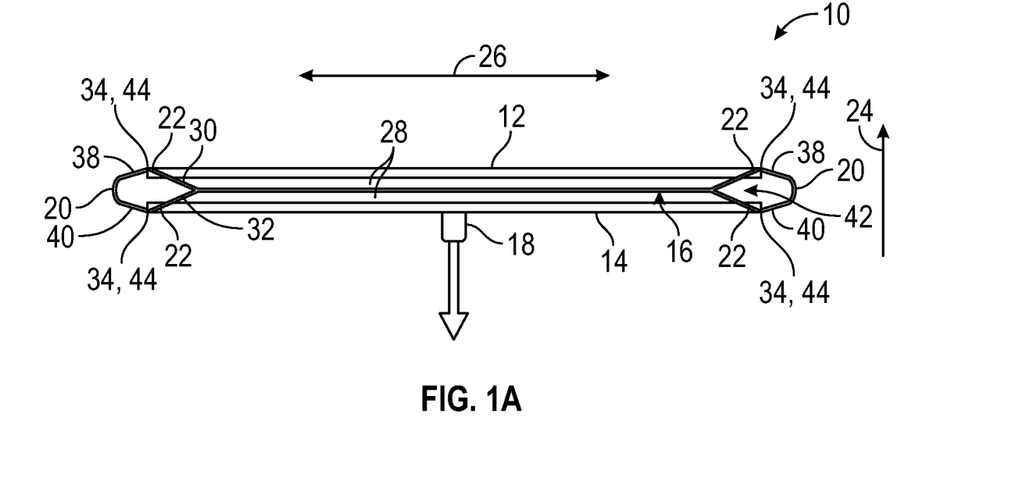
FIG. 1A is a perspective partial cross-sectional view of a skin-constrained inflatable bellows system in an uninflated state in accordance with an aspect of the present disclosure.
Figure 1B:
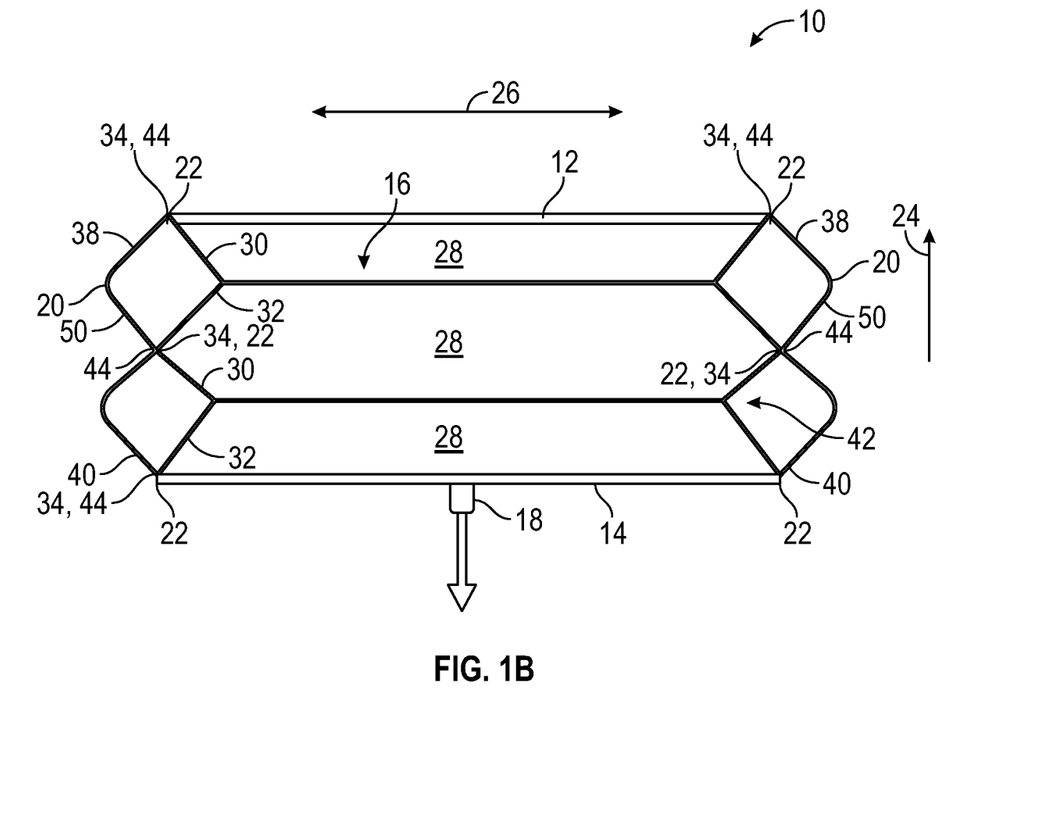
FIG. 1B is a perspective partial cross-sectional view of the skin-constrained inflatable bellows system of FIG. 1A in a partially inflated state in accordance with an aspect of the present disclosure.
Figure 1C:
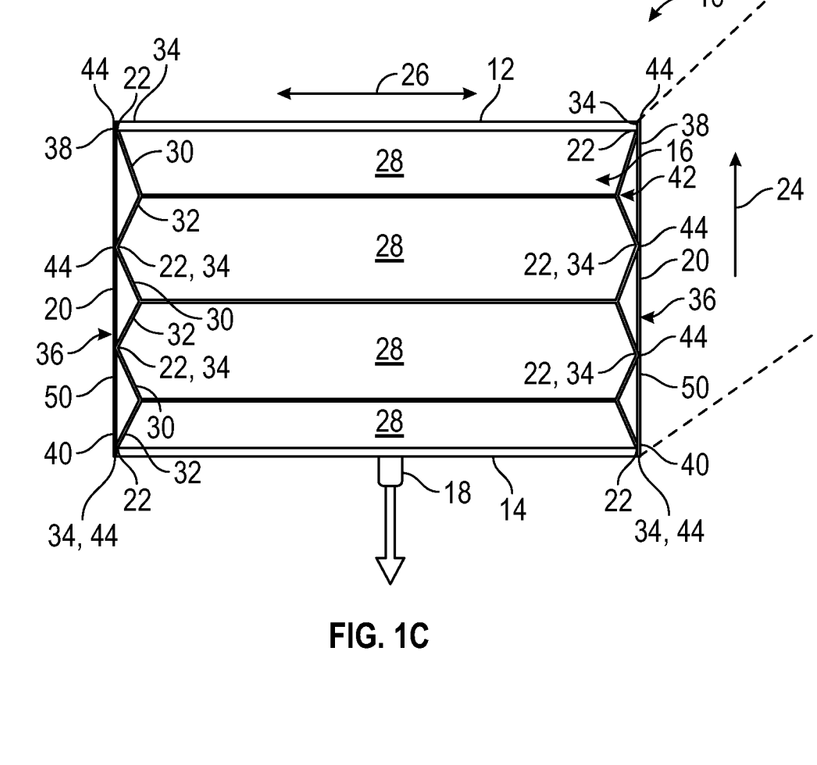
FIG. 1C is a perspective partial cross-sectional view of the skin-constrained inflatable bellows system of FIGS. 1A and 1B in a fully inflated state in accordance with an aspect of the present disclosure.

Referring to FIGS. 1A, 1B, and 1C, the skin-constrained inflatable bellows system 10 is shown in multiple configurations. Specifically, FIG. 1A depicts the skin-constrained inflatable bellows system 10 in a stowed or uninflated position. FIG. 1B depicts the skin-constrained inflatable bellows system 10 in a partially unstowed, or partially inflated position, and FIG. 1C depicts the skin-constrained inflatable bellows system 10 in a fully deployed or fully inflated position. The skin-constrained bellows system 10 includes a top end cap 12, a bottom end cap 14, a bellows 16, a nozzle 18, and a skin 20.

Each of the top and bottom end caps 12, 14 is a rigid structure having a perimeter edge 22. The bellows 16 is attached to the perimeter edges 22 of the top and bottom end caps 12, 14, and is configured to hold pressurized fluid, such as air, between the top and bottom end caps 12, 14. The nozzle 18 is operable to allow fluid to enter and exit the bellows 16. The skin 20 is coupled to the top and bottom end caps 12, 14. When the bellows 16 is inflated, the skin 20 constrains the motion of the top end cap 12 relative to the bottom end cap 14, and thereby restricts the number and type of degrees of freedom of the inflatable structure 10.

In the inflatable structures described herein, it is assumed that the bottom end cap 14 is stationary or fixed in space, and movement of the top end cap 12 is only constrained by the bellows 16 and the skin 20. However, in various implementations, the top end cap 12 may be stationary or fixed in space, and movement of the bottom end cap 14 may only be constrained by the bellows 16 and the skin 20 that connect the top and bottom end caps 12, 14 to one another. In other implementations, neither one of the top or bottom end caps 12, 14 are stationary or fixed in space, and movement of the top and bottom end caps 12, 14 may only be constrained by the bellows 16 and skin 20 that connect the top and bottom end caps 12, 14 to one another.

The top and bottom end caps 12, 14 provide hard attachment points for the skin 20. The material and geometry of the top and bottom end caps 12, 14 is selected to ensure that the top and bottom end caps 12, 14 do not bend when a load or pressure is applied to either one of the top and bottom end caps 12, 14. The top and bottom end caps 12, 14 may be made from a rigid material such as acrylonitrile butadiene styrene, Delrin®, acetal, or the like. The top and bottom end caps 12, 14 are sealed to the bellows 16. Thus, fluid is only allowed to enter or exit the bellows 16 through the nozzle 18.

The bellows 16 is configured to contain a pressurized fluid, such as a gas (e.g., air, helium, or the like) or a liquid, between the top and bottom end caps 12, 14. The bellows 16 may be made from a soft inextensible material. For example, the bellows 16 may be made from silicone, thermoplastic polyurethane (TPU), and or a TPU-coated fabric. The geometry and/or material of the bellows 16 is selected to ensure that the bellows 16 does not affect the motion of the inflatable structure 10. Ideally, the bellows 16 is flexible in an axial direction 24 of the inflatable structure 10, and rigid in all radial directions of the inflatable structure 10 including a radial direction 26.

In several aspects, the bellows 16 defines one or more inflatable chambers 28. Each of the inflatable chambers is formed of a top portion 30, and a bottom portion 32. The top and bottom portions 30, 32 are joined to one another via known thermal, chemical, or mechanical means used for impermeably adhering silicone, TPU, or TPU-coated fabric segments together. More specifically, each of the top portion 30 and bottom portion 32 of the inflatable chambers 28 is sealed fully around the inflatable chamber 28 perimeter to define a bellows flange 34. The bellows flanges 34 generate an airtight bellows 16 structure, but increase overall deployed and stowed width.

In some examples, the nozzle 18 extends through the bottom end cap 14 and is adjustable between an open position and a closed position. When the nozzle 18 is in the open position, the nozzle 18 allows fluid to enter or exit the bellows 16. When the nozzle 18 is in a closed position, the nozzle 18 prevents fluid from entering or exiting the bellows 16. The nozzle 18 may be a mechanically controlled valve (e.g., a Schrader valve, a Presta valve, or the like), or an electronically controlled valve.

Figure 1D:
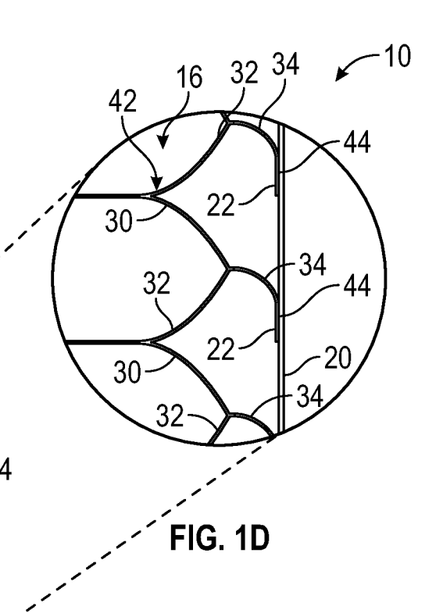
FIG. 1D is a perspective partial cross-sectional view of a portion of the skin-constrained inflatable bellows system of FIG. 1C showing bellows flanges and skin attachments in additional detail in accordance with an aspect of the present disclosure.

Referring now to FIG. 1D, and with continuing reference to FIGS. 1A-1C, the bellows flange 34 defines a radially-outward-most portion of each of the inflatable chambers 28. In some examples, the skin 20 is attached to each bellows flange 34 to reduce a footprint size of the skin-constrained inflatable bellows system 10 in the uninflated state. That is, because the skin 20 is attached to some or all of the bellows flanges 34, the skin 20 causes the bellows flanges 34 to fold up against the skin 20 when the bellows 16 is inflated. This reduces the overall width of the skin-constrained inflatable bellows system 10 by approximately twice the width of the bellows flanges 34. Additionally, because the skin 20 is attached to some or all of the bellows flanges 34, the bellows 16 prevents the skin 20 from spreading significantly radially outward from the bellows 16 as the skin-constrained inflatable bellows system 10 is deflated, or in the uninflated state. When the system 10 is in the uninflated state, the bellows flanges 34 lie flat. To facilitate accurate deployment, inflation, and a smooth external surface 36 of the skin-constrained inflatable bellows system 10, the skin 20 is attached to only one of the top or bottom portions 30, 32 of the inflatable chambers 28. Accordingly, as the skin-constrained inflatable bellows system 10 reaches the fully-inflated position depicted in FIGS. 1C and 1D, the bellows flanges 34 remain attached to the skin 20 and bend to allow the skin 20 to draw taught over the inflatable bellows 16.

Figure 2:
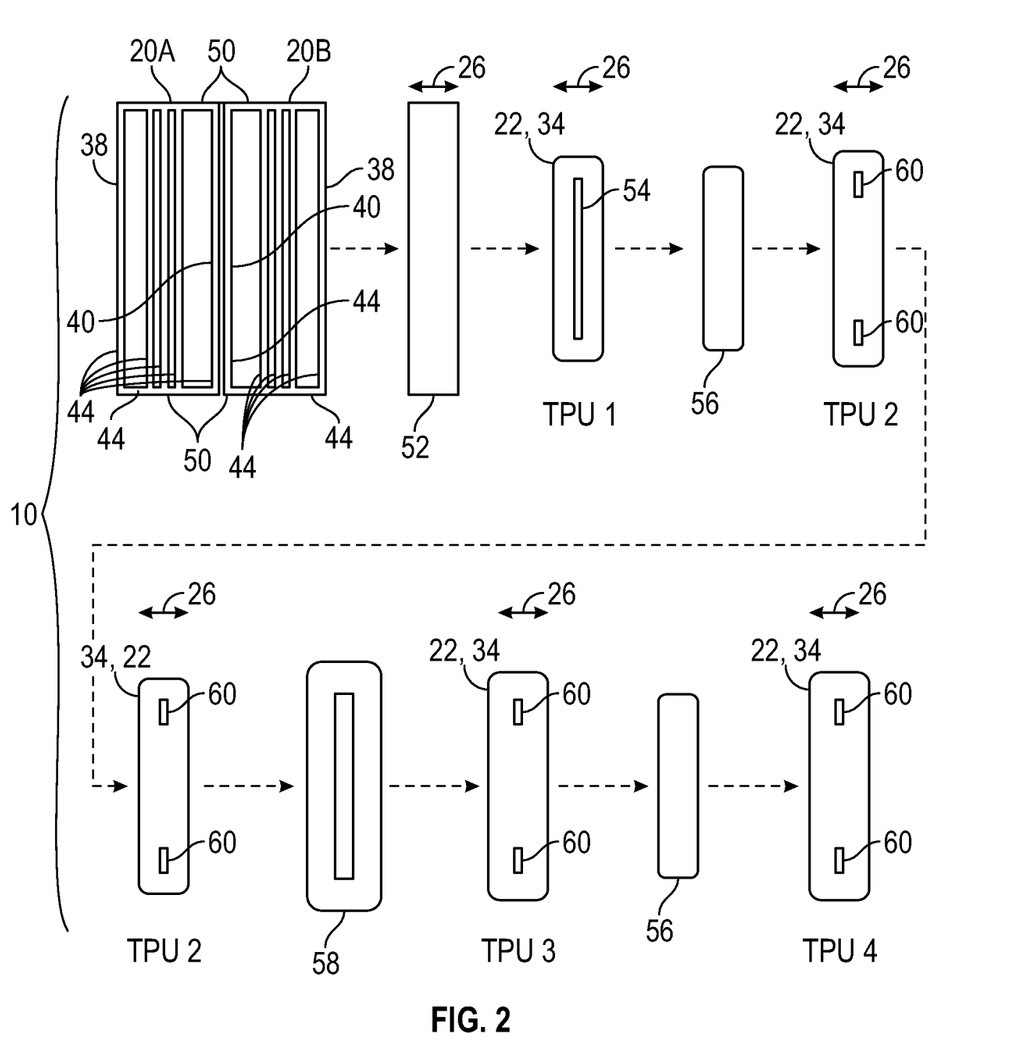
FIG. 2 is an exploded diagram for the incremental assembly of a skin-constrained inflatable bellows system according to an aspect of the present disclosure.

Turning now to FIG. 2 and with continuing reference to FIGS. 1A-1D, a portion of the skin 20 is shown in further detail. More specifically, the skin-constrained inflatable bellows system 10 is shown in an exploded top view. The skin 20 has an upper end 38 coupled to the top end cap 12 and a lower end 40 coupled to the bottom end cap 14. The skin 20 is a thin sheet of inextensible material such as nylon, cotton, or the like. The nylon, cotton, or other such inextensible material may further be impregnated or coated with materials that provide desirable characteristics, such as watertightness, airtightness, or predetermined permeability characteristics. Likewise, the inextensible material and/or substances impregnated into the inextensible skin 20 may impart color, texture, or the like without departing from the scope or intent of the present disclosure. The skin 20 may provide a smooth external surface for the inflatable structure. A smooth external surface can improve aerodynamic qualities of the inflatable structure, provide for easier cleaning. In some examples, the skin 20 may be removable or partially removable from other portions of the inflatable structure to aid in cleaning, or for wear-replacement or aesthetic reasons. Similarly various different materials may be used for the skin 20, allowing for different aesthetic and physical characteristics to be created or used in different applications or uses. The material strength of the skin is sufficient to withstand a predetermined load applied to the inflatable structure 10. Applying a load greater than the predetermined load to the inflatable structure 10 may cause the bellows 16 to buckle.

The length of the bellows 16 (i.e., the dimension of the bellows 16 in the axial direction 24) may be greater than the length of the skin 20 to ensure that the skin 20 is placed in tension and the bellows 16 may have slack when the bellows 16 is inflated. In the example shown, the bellows 16 includes a folded portion 42 that extends in the axial direction 24 below the perimeter edge 22 of the bottom end cap 14 and is folded onto itself. In several aspects, the skin 20 extends in the axial direction 24, which is substantially perpendicular to the top and bottom end caps 12, 14. If the skin 20 was to extend in a direction other than the axial direction 24 when the bellows 16 is inflated, the length of the bellows 16 may be greater than an effective length of the skin 20. The effective length of the skin 20 is the distance by which the skin 20 extends between the top and bottom end caps 12, 14 in the axial direction 24. In several aspects, for a skin-constrained inflatable bellows system 10 having a substantially rectilinear solid shape, the skin 20 is formed of one or more substantially rectangular pieces of inextensible material joined or otherwise affixed to the bellows 16 as described herein. However, it should be appreciated that the skin-constrained inflatable bellows 16 may have a variety of shapes differing from rectilinear solids without departing from the scope or intent of the present disclosure.

Figure 3:
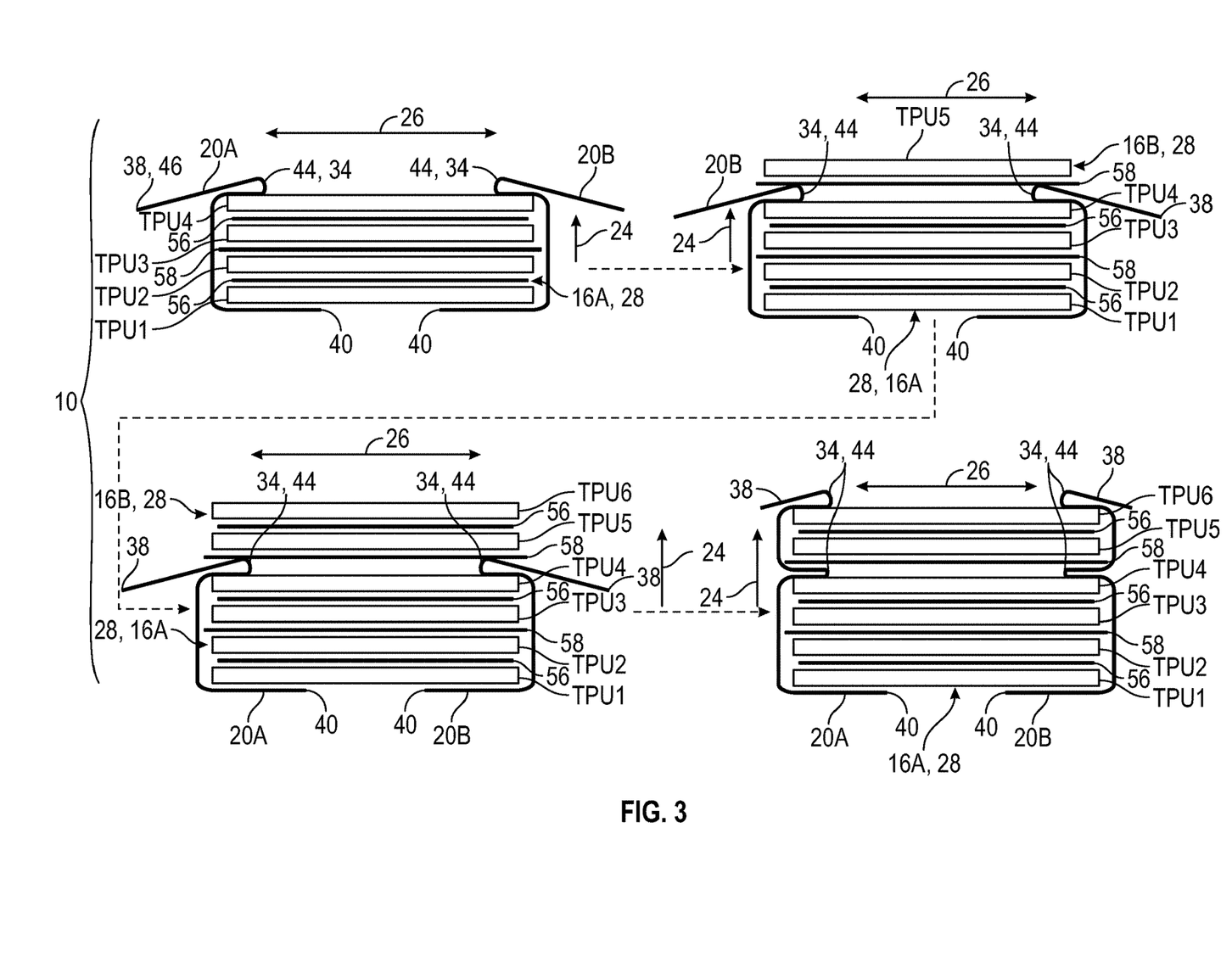
FIG. 3 is a partial cross-sectional view of a portion of the incremental assembly of a skin-constrained inflatable bellows system according to an aspect of the present disclosure.

Turning now to FIG. 3 and with continuing reference to FIGS. 1A-2 the skin 20 is coupled to the top end cap 12, the bottom end cap 14, and the bellows 16 via one or more bellows attachment features 44. The bellows attachment features 44 may define any of a variety of different permanent, semi-permanent, or removable attachment means. In several examples, the bellows attachment features 44 may include heat-sealable attachments, adhesives, mechanical fasteners such as hook-and-loop fasteners, tongue-in-groove or similar fasteners, the like without departing from the scope or intent of the present disclosure. Likewise, the bellows flanges 34 may have features which directly or indirectly interact with the bellows attachment features 44 of the skin 20 to ensure that the skin 20 and bellows 16 are correctly located relative to one another and affixed to one another. In a particular non-limiting example, the bellows attachment features 44 define heat-sealable TPU strips sealed or otherwise bonded into the skin 20 at specific locations which align with the bellows flanges 34 during assembly. A width of the TPU strips is substantially equivalent to the width or radially extent of the bellows flanges 34. Additional bellows attachment features 44 extend along upper ends 38 and lower ends 40 of the skin 20. Further bellows attachment features 44 may be located at other positions on the skin 20, such as along vertical edges 50 of the skin 20 which may attach to the bellows 16, other sections of the skin 20, or the like. In several aspects, gaps between bellows attachment features 44 on the skin 20 vary in size such that a larger gap is located between TPU strips at the lower ends 40 in comparison with the gaps proximate the upper ends 38 to allow the flanges 34 to fold upwards during inflation.

The skin 20 may be manufactured with pre-patterned TPU strip-type bellows attachment features 44. The pre-patterned manufacture enables attachment when fabricating a stack of skin-constrained inflatable bellows system 10 components. Spacing between the bellows attachment features 44 also prevents unwanted attachment to the bellows 16 when heat pressing the bellows 16 to the skin 20 during assembly. The skin-constrained inflatable bellows system 10 of the present disclosure may be assembled in an incremental construction method. Patterning of the bellows attachment features 44 on the skin allows the simultaneous sealing of the skin 20 to bellows flanges 34 while fabricating bellows 16 layers. Such incremental construction ensures that sealed bellows 16 are formed and that the skin 20 is attached to the bellows 16 incrementally to form the entire stack of bellows 16 and skin 20 components.

In an example in which the skin 20 has TPU bellows attachment features 44, a first incremental manufacturing step includes placing the material to be used for the skin 20 on or in a heat press. More specifically, two skin panels 20A and 20B are placed such that the lower ends 40 are placed parallel to one another and nearly touching. A glassine strip 52 having a width slightly wider than the extend of the top and bottom portions 30, 32 of the bellows 16 material is placed in the center where the two skin panels 20A and 20B meet. The glassine strip 52 prevents the bellows 16 itself sealing to the TPU of the skin 20 in an undesired location.

The bellows 16 may be constructed of a series of bellows 16 portions 16A, 16B . . . 16N. A first TPU layer (TPU1) having a large slot 54 is placed on top of the glassine strip 52, followed by an inner mask 56 and an intermediate TPU layer (TPU2). The heat press is then used to seal TPU1 and TPU2 at a predetermined temperature for a predetermined amount of time. In some examples, the TPU1 and TPU2 are heated to approximately 300° F. for approximately 75 seconds. The large slot 54 in TPU1 allows air or other pressurized fluid to pass through TPU1 and to fill the bellows 16 portions.

A further bellows portion 16B may be constructed and sealed to the first bellows portion 16A. An outer mask 58 is placed on top of TPU2, and another intermediate TPU layer (TPU3) is then placed overtop the outer mask 58. The heat press may then be used to seal TPU2 and TPU3 as described above. The process described above may then be repeated to form additional bellows portions 16B . . . 16N by placing a further inner mask 56 overtop TPU3, followed by another intermediate layer TPU4 which are then sealed together by heating as described above. The inner and outer masks 56, 58 prevent the various TPU layers from adhering to one another during assembly. In several examples, the inner and outer masks 56, 58 are removed from the bellows 16 in a post assembly process. The inner and outer masks 56, 58 may be removed by various means depending on the particular application. In some examples, the inner and outer masks 56, 58 are removed from the bellows 16 via mechanical means, via a solvent or other chemical means, or the like. In a particular example, the inner and outer masks 56, 58 are made of a water soluble material such as paper, glycerine, glassine, paper soap, or the like. In some examples, the inner and outer masks 56, 58 are made from materials which are soluble to substances such as alcohols, acetone, or other such solvents which are non-reactive relative to TPU.

As shown in the figures, TPU2, TPU3, and TPU4 include a plurality of small slots 60. It should be appreciated that while the small slots 60 are shown in only two locations on each of TPU2, TPU3, and TPU4, there may be greater than two small slots 60, or fewer than two small slots 60 without departing from the scope or intent of the present disclosure. However, it should also be appreciated that each of TPU1, TPU2, TPU3, TPU4 and so forth provide radial limits to the bellows 16. Accordingly, if multiple adjacent bellows portions 16A, 16B, 16C, 16D and so forth include intermediate TPU layers TPU1, TPU2, TPU3, TPU4, etc., having only a single large slot 54 in each, the bellows 16 may not be properly radially confined and can expand radially outwards in an undesirable shape or inducing a lack of structural stability in the overall structure of the skin-constrained inflatable bellows system 10.

The skin 20 is sealed to the bellows flanges 34 at each of the bellows attachment features 44. More specifically, the skin 20 is folded over TPU4, then folded back over such that the bellows attachment features 44 in the skin 20 are lying flat on the bellows flanges 34 of TPU4. The heat press is then activated to connect the bellows attachment features 44 to the bellows flanges 34 of TPU4. In some examples, additional heating processes may be used to increase the completeness of the seal between the skin 20 and the bellows 16. The bellows 16 assembly process may be further continued by applying an outer mask 58 on TPU4, another intermediate layer TPU5 overtop the outer mask 58, and heat pressing at the settings described previously. By placing another inner mask 56 on TPU5, another intermediate layer TPU6, and then heat pressing, the bellows 16 may be completed and the skin 20 may subsequently be sealed to the bellows flanges 34 once again. Each of the inner and outer masks 56, 58 inhibit sealing of the TPU layers to one another over the footprint of the inner and outer masks 56, 58.

It should be appreciated that the bellows 16 construction process described above may be repeated any number of times to create bellows 16 having a wide variety of heights for different applications. That is, the process may be repeated as many times as necessary for a given application using inner masks 56 and outer masks 58 to seal further bellows portions 16N, then folding the skin 20 over to connect the skin 20 to the bellows portion 16N. In a five-bellow 16 construction, the process should be completed a total of three times so that the skin 20 is folded and sealed to the TPU layers three times. After the third repetition, an outer mask 58 is placed on TPU8, and an intermediate layer TPU9 is placed overtop the outer mask 58. The layers are then heat-pressed. An inner mask 56 is placed on TPU9, and a TPU bellow 16 having a large slot TPU10 is placed on top of the inner mask 56. The layers are then heat-pressed to ensure a proper seal, and to complete the fabrication process.

The skin 20 is subsequently affixed to each of the top and bottom end caps 12, 14 using the heat press. More specifically, the bellows attachment features 44 are heated in a manner that ensures that the TPU strips are melted into the top and bottom end caps 12, 14. The top and bottom end caps 12, 14 are thereby sealed to the bellows 16. The bottom end cap 14 is placed within the large slot 54 of TPU1 with the TPU side of the bottom end cap 14 facing away from the remainder of the bellows 16. A height of the heat press is adjusted to account for the thickness of the bottom end cap 14, and then heated as described hereinabove. The process is similarly repeated at the opposite end of the bellows 16 such that the top end cap 12 is inserted through the large slot 54 of TPU10 with the TPU side of the top end cap 12 facing away from the remainder of the bellows 16, then heat-sealed as described previously.

While other materials may be used for the bellows 16 as well as for the bellows attachment features 44 on the skin 20, the use of TPU simplifies the assembly process. This is because TPU seals well to other TPU materials, but not to the nylon, cotton, or other such inextensible material making up the skin 20 itself. Accordingly, embedding TPU strips into the skin 20 is an effective way of ensuring that bellows flanges 34 only seal to the skin 20 at predefined, desired locations. If the TPU was impregnated throughout the skin 20, assembly of the bellows 16 would increase in complexity as the bellows flanges 34 would be difficult to place at precise locations on the skin 20. Furthermore, the gaps between bellows attachment features 44 on the skin 20 ensure that the skin 20 will not adhere or seal to itself when folded over the bellows flanges 34 during assembly.

By attaching the skin 20 to the bellows flanges 34 while both the skin 20 and the bellows flanges 34 are flat within the heat press, a length of the skin 20 is parallel to the bellows flanges 34, allowing the skin 20 to become fully stretched when inflated. If the skin 20 was attached to the bellows 16 after the bellows 16 was sealed, there would be a risk that the bellows flange 34 attachment to the skin will not be parallel to the long axis of the skin 20. Under such circumstances, the skin 20 could undesirably pull upward or downward on one side of the bellows 16.

Attachment of the skin 20 to the bellows 16 during the sealing process is, accordingly, a simpler and more accurate manufacturing method in comparison to attaching the skin 20 to the bellows 16 after the bellows 16 has been sealed. While the masking material is between each layer of the bellows 16, there is no risk of improperly sealing the layers of the bellows 16 together or puncturing the bellows 16. Further, by integrating assembly of the skin 20 with the sealing of the bellows 16, the process is made more efficient and more scalable for mass-production.

Multiple skin panels 20A and 20B may be combined to fully wrap around and effectively encapsulate the bellows 16. Skin panels 20A and 20B are attached to one another to fully surround all sides of the bellows 16. The skin panels 20A and 20B may be attached to one another my known means including fabric glues, hook and loop fasteners, sewing, heat-sealing, and the like. In further examples, additional skin panels 20C . . . 20N may be used to surround the bellows 16. In a particular example, four skin panels 20A, 20B, 20C, and 20D individually cover each of the vertical wall portions of the rectilinear solid formed by the bellows 16. Extending the skin panels 20A, 20B . . . 20N beyond the ends of the bellows 16 allows the fully-assembled skin 20 to wrap around the bellows 16 and connect to other skin panels 20A . . . 20N. With the skin 20 on all sides of the bellows 16, none of the bellows 16 is exposed directly. Instead, a smooth external surface 36 is formed by the skin when the bellows 16 is fully inflated.

Figure 4A:
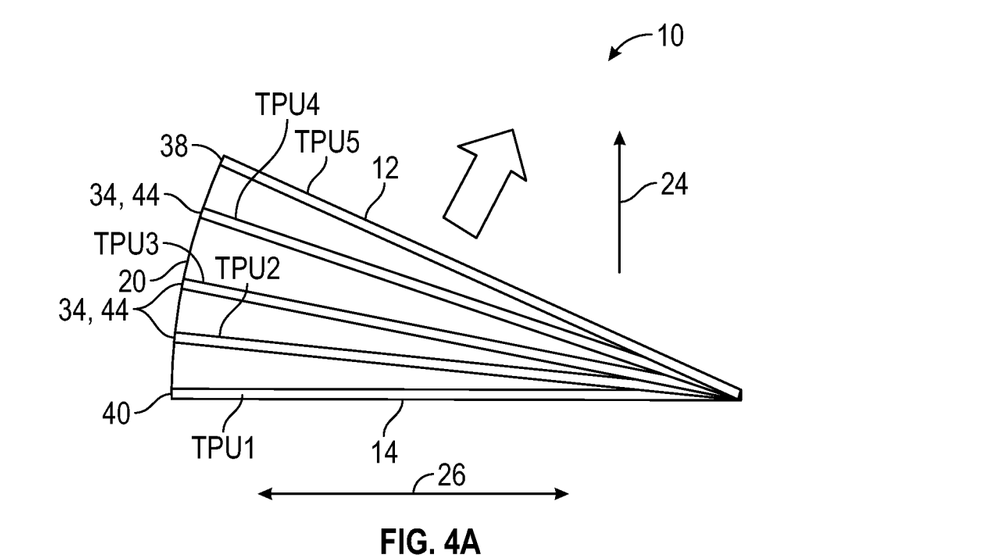
FIG. 4A is a partial cross-sectional side view of a non-rectilinear skin-constrained inflatable bellows system in a partially inflated state according to an aspect of the present disclosure.
Figure 4B:
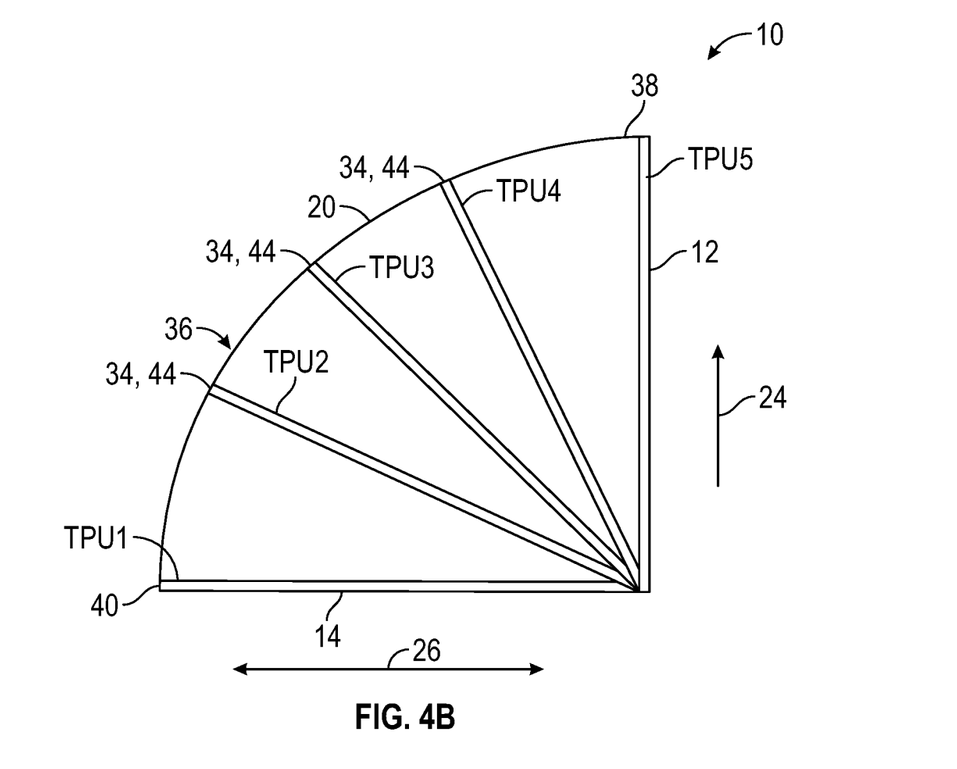
FIG. 4B is a partial cross-sectional side view of a non-rectilinear skin-constrained inflatable bellows system in a fully inflated state according to an aspect of the present disclosure.

Turning now to FIGS. 4A and 4B, a non-rectilinear skin-constrained inflatable bellows system 10 is shown. FIG. 4A depicts the system 10 in a partially inflated state, and FIG. 4B depicts the system 10 in a fully inflated state. More specifically, by not allowing expansion of the bellows 16 at one end while tapering expansion to the other end of the bellows 16 a non-rectilinear skin 20 may be used to constrain a bellows 16 structure whose vertical expansion is non-uniform. That is the embedded TPU strips forming the bellows attachment features 44 on a non-rectilinear skin may be arranged radially from a point on the bellows 16 that does not expand. This allows the skin 20 to be attached to the flanges of the bellows 16 as the bellows 16 inflates. The radial placement of the embedded TPU strips provides for skin-constrained inflatable bellows system 10 structures that expand in a non-rectilinear fashion. This allows for the inflation of structures that have variations in height from one end of the bellows 16 to another end of the bellows 16. Such non-rectilinear shapes may be useful for aerodynamic devices, such as spoilers, chin spoilers, splitters, side skirts, or steps attached to side skirts of certain motor vehicles. Additionally, the skin-constrained inflatable bellows system 10 of the present disclosure may be adapted in size, shape, rigidity, and so forth for a wide variety of different applications including but not limited to: inflatable storage bins, inflatable quarter circles on a truck cab, inflatable motor vehicle bumper extensions, inflatable vertical side skirts, inflatable cargo dividers, or the like. It should be appreciated that while the skin-constrained inflatable bellows system 10 depicted in FIGS. 4A and 4B has a substantially fan-shaped cross-section, and that the skin-constrained inflatable bellows system 10 depicted elsewhere in FIGS. 1A-3D. have substantially rectilinear solid shapes, that variations in shape and degrees of freedom are intended to be within the scope of the present disclosure. That is, the skin 20 constrains the deployed or expanded shape of the bellows 16 and generally defines the deployed shape of the skin-constrained inflatable bellows system 10.

In some examples, the skin 20 is removable or replaceable. Accordingly, different skin 20 shapes and sizes may be used with the same underlying bellows 16 to generate variable three-dimensional skin-constrained inflatable bellows system 10 shapes. That is, the inflated geometry of the skin-constrained inflatable bellows system 10 can be made variable by swapping skins 20. In such examples, the skin 20 and the bellows flanges 34 are affixed to one another via temporary or replaceable means such as hook-and-loop fasteners, tongue-and-groove fasteners or other mechanical fasteners, temporary heat-sealable attachments, adhesives, or the like.

The skin 20 of the skin-constrained inflatable bellows system 10 dramatically increases shear resistance by comparison with similar bellows 16 structures having no external skin 20. In experiments it has been found that a skin 20 which wraps entirely around all four sides of the bellows 16 increases shear resistance by approximately 1.4 times over a skin 20 constrained bellows 16 in which only two parallel sides of the bellows 16 are equipped with skin 20. Additionally, it has been experimentally determined that even when a bellows 16 is equipped with skin 20 only two parallel sides, the bellows 16 may be approximately 4.6 times more shear resistant and 3.3 times more vertical compression resistant than an entirely un-skin-constrained bellows 16.

A skin-constrained inflatable bellows system 10 of the present disclosure offers several advantages. These include an inflatable structure and method of construction thereof, which maintain or increase the structural capabilities of the inflatable structures while improving packaging size, providing a rigid deployment in multiple degrees of freedom, having a smooth external surface which aids in cleaning, increasing shear resistance, and decreasing weight while maintaining or decreasing cost and decreasing manufacturing complexity.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An incrementally assembled skin-constrained inflatable bellows system, the system comprising:
   a top end cap;
   a bottom end cap;
   a bellows attached to and separating the top end cap and the bottom end cap and configured to hold pressurized fluid between the top and bottom end caps;
   a nozzle configured to allow fluid to enter and exit the bellows; and
   an inextensible skin attached to each of the top end cap, the bottom end cap, and to the bellows; and
   wherein the top end cap assumes a first position when the bellows is inflated via the nozzle and, when the top end cap is adjusted from the first position to a second position, the skin is configured to maintain the top end cap in the second position and constrains the bellows into a predefined rigid three-dimensional shape.

2. The incrementally assembled skin-constrained inflatable bellows system of claim 1 wherein the bellows comprises:
   one or more inflatable chambers, wherein each of the one or more inflatable chambers is formed of one or more top portions and one or more bottom portions; each of the one or more top portions is sealed around a perimeter edge to one of the one or more bottom portions, and wherein the perimeter edge defines a radially-extending bellows flange.

3. The incrementally assembled skin-constrained inflatable bellows system of claim 2 wherein the one or more top portions and the one or more bottom portions define a folded portion of the bellows that extends in an axial direction between a perimeter edge of the top end cap and a perimeter edge of the bottom cap, and wherein the folded portion of the bellows includes one or more folds that reduce a stiffness of the bellows in an axial direction of the skin-constrained inflatable bellows system.

4. The incrementally assembled skin-constrained inflatable bellows system of claim 2 wherein the inextensible skin is replaceable, wherein differently shaped replaceable inextensible skins constrain the bellows to define different inflated three-dimensional geometries of the fully inflated skin-constrained inflatable bellows system.

5. The incrementally assembled skin-constrained inflatable bellows system of claim 4 wherein the inextensible skin includes a plurality of bellows attachment features at predefined locations that align with one or more of the bellows flanges and the top and bottom end caps.

6. The incrementally assembled skin-constrained inflatable bellows system of claim 5 wherein the one or more of the radially-extending bellows flanges is attached to the inextensible skin at one or more of the plurality of bellows attachment features.

7. The incrementally assembled skin-constrained inflatable bellows system of claim 5 wherein each of the one or more top portions includes one or more slots and each of the one or more bottom portions includes one or more slots, and the one or more top portions and the one or more bottom portions are heat sealed to one another only about the perimeter edge through use of a removable mask, and wherein the one or more slots in the one or more top and bottom portions allow airflow through the one or more top and bottom portions while maintaining a shape and structural integrity of the bellows.

8. The incrementally assembled skin-constrained inflatable bellows system of claim 7 wherein:
the bellows is formed of a material comprising one or more of: silicone, thermoplastic polyurethane (TPU), or a TPU-coated fabric; and
the bellows attachment features on the inextensible skin comprise TPU-impregnated portions of inextensible skin material, and wherein the removable mask is formed from a material comprising one or more of: paper, glassine, glycerine, and paper soap, wherein the removable mask is soluble in a solvent that is not reactive with TPU, wherein the solvent comprises one or more of: water, acetone, and alcohol.

9. The incrementally assembled skin-constrained inflatable bellows system of claim 1 wherein the inextensible skin fully encapsulates the bellows and provides a smooth external surface when the skin-constrained inflatable bellows system is fully inflated.

10. The incrementally assembled skin-constrained inflatable bellows system of claim 9 wherein the inextensible skin extends for a first axial distance on a first side of the bellows and for a second axial distance smaller than the first axial distance on a second side of the bellows, wherein the second side is opposite the first side, and wherein when the skin-constrained inflatable bellows system is fully inflated, the rigid three-dimensional shape is constrained by the skin to a non-rectilinear shape.

11. A method of producing a skin-constrained inflatable bellows comprising:
incrementally assembling a top end cap, a bottom end cap, and a bellows attached to and separating the top end cap and the bottom end cap, the bellows configured to hold pressurized fluid between the top and bottom end caps;
attaching an inextensible skin to each of the top end cap, the bellows, and the bottom end cap;
utilizing a nozzle disposed on one or more of the top end cap and the bottom end cap to allow fluid to enter and exit the bellows, wherein the top end cap assumes a first position when the bellows is inflated via the nozzle and, when the top end cap is adjusted from the first position to a second position, the skin is configured to maintain the top end cap in the second position and constrains the bellows into a predefined rigid three-dimensional shape.

12. The method of producing a skin-constrained inflatable bellows of claim 11 further comprising:
assembling one or more inflatable chambers, wherein each of the one or more inflatable chambers is formed of one or more top portions and one or more bottom portions; and
sealing each of the one or more top portions around a perimeter edge to one of the one or more bottom portions, wherein the perimeter edge defines a radially-extending bellows flange.

13. The method of producing a skin-constrained inflatable bellows of claim 12 further comprising:
masking the one or more top portions and the one or more bottom portions with a removable mask; and
heat sealing each of the one or more top portions to one of the one or more bottom portions only about the perimeter edge as a result of the masking, wherein each of the one or more top portions includes one or more slots and each of the one or more bottom portions includes one or more slots, and the one or more slots in the one or more top and bottom portions allows airflow while maintaining a shape and structural integrity of the bellows.

14. The method of producing a skin-constrained inflatable bellows of claim 13 further comprising:
folding the one or more top portions and the one or more bottom portions to define a folded portion of the bellows that extends in an axial direction between a perimeter edge of the top end cap and a perimeter edge of the bottom cap, wherein the folded portion of the bellows includes one or more folds that reduce a stiffness of the bellows in an axial direction of the skin-constrained inflatable bellows system.

15. The method of producing a skin-constrained inflatable bellows of claim 14 further comprising:
equipping the inextensible skin with a plurality of bellows attachment features at predefined locations that align with one or more of the bellows flanges and the top and bottom end caps.

16. The method of producing a skin-constrained inflatable bellows of claim 15 further comprising:
attaching the inextensible skin to the one or more of the radially-extending bellows flanges at one or more of the plurality of bellows attachment features.

17. The method of producing a skin-constrained inflatable bellows of claim 15 wherein:
forming the bellows of a material comprising one or more of: silicone, thermoplastic polyurethane (TPU), or a TPU-coated fabric; and
forming the bellows attachment features on the inextensible skin from TPU-impregnated portions of inextensible skin material; and
forming the removable mask from a material comprising one or more of: paper, glassine, glycerine, and paper soap, wherein the removable mask is soluble in a solvent that is not reactive with TPU, wherein the solvent comprises one or more of: water, acetone, and alcohol.

18. The method of producing a skin-constrained inflatable bellows of claim 11 further comprising:
fully encapsulating the bellows with the inextensible skin to provide a smooth external surface when the skin-constrained inflatable bellows is fully inflated, wherein the inextensible skin is replaceable, and wherein differently shaped replaceable inextensible skins constrain the bellows to define different inflated three-dimensional geometries of the fully inflated skin-constrained inflatable bellows.

19. The method of producing a skin-constrained inflatable bellows of claim 18 further comprising:
producing a non-rectilinear rigid three-dimensional shape skin-constrained inflatable bellows by providing inextensible skin that extends for a first axial distance on a first side of the bellows and for a second axial distance smaller than the first axial distance on a second side of the bellows, wherein the second side is opposite the first side.

20. An incrementally assembled skin-constrained inflatable bellows system, the system comprising:
a top end cap;
a bottom end cap;
a bellows attached to and separating the top end cap and the bottom end cap and configured to hold pressurized fluid between the top and bottom end caps, wherein the bellows includes:
one or more inflatable chambers, wherein each of the one or more inflatable chambers is formed of one or more top portions and one or more bottom portions; each of the one or more top portions is sealed around a perimeter edge to one of the one or more bottom portions, wherein the perimeter edge defines a radially-extending bellows flange,
wherein each of the one or more top portions includes one or more slots and each of the one or more bottom portions includes one or more slots, and the one or more top portions and the one or more bottom portions are heat sealed to one another only about the perimeter edge through use of a removable mask, wherein the removable mask is formed from a material comprising one or more of: paper, glassine, glycerine, and paper soap, wherein the removable mask is soluble in a solvent that is not reactive with TPU, wherein the solvent comprises one or more of: water, acetone, and alcohol, and
wherein the one or more slots in the one or more top and bottom portions allow airflow through the one or more top and bottom portions while maintaining a shape and structural integrity of the bellows;
wherein the one or more top portions and the one or more bottom portions define a folded portion of the bellows that extends in an axial direction between a perimeter edge of the top end cap and a perimeter edge of the bottom cap;
wherein the folded portion of the bellows includes one or more folds that reduce a stiffness of the bellows in an axial direction of the skin-constrained inflatable bellows system;
a nozzle configured to allow fluid to enter and exit the bellows;
an inextensible skin attached to each of the top end cap, the bottom end cap, and to the bellows, wherein the inextensible skin includes a plurality of bellows attachment features at predefined locations that align with one or more of the bellows flanges and the top and bottom end caps;
wherein the one or more of the radially-extending bellows flanges is attached to the inextensible skin at one or more of the plurality of bellows attachment features;
wherein the bellows is formed of a material comprising one or more of: silicone, thermoplastic polyurethane (TPU), or a TPU-coated fabric;
the bellows attachment features on the inextensible skin comprise TPU-impregnated portions of inextensible skin material; and
wherein the top end cap assumes a first position when the bellows is inflated via the nozzle and, when the top end cap is adjusted from the first position to a second position, the skin is configured to maintain the top end cap in the second position and constrains the bellows into a predefined rigid three-dimensional shape, wherein the inextensible skin fully encapsulates the bellows and provides a smooth external surface when the skin-constrained inflatable bellows system is fully inflated, and wherein when the inextensible skin extends for a first axial distance on a first side of the bellows and for a second axial distance smaller than the first axial distance on a second side of the bellows, the rigid three-dimensional shape is constrained by the skin to a non-rectilinear shape,
wherein the inextensible skin is replaceable, and differently shaped replaceable inextensible skins constrain the bellows to different inflated three-dimensional geometries of the fully inflated skin-constrained inflatable bellows system.

* * * * *